United States Patent [19]
Warnock et al.

[11] Patent Number: 6,151,576
[45] Date of Patent: Nov. 21, 2000

[54] MIXING DIGITIZED SPEECH AND TEXT USING RELIABILITY INDICES

[75] Inventors: John E. Warnock, Los Altos; T. V. Raman, Mountain View, both of Calif.

[73] Assignee: Adobe Systems Incorporated, San Jose, Calif.

[21] Appl. No.: 09/132,875

[22] Filed: Aug. 11, 1998

[51] Int. Cl.[7] .............................. G10L 13/00; G10L 15/26
[52] U.S. Cl. ........................... 704/260; 704/235; 704/239
[58] Field of Search ................................... 704/235, 260, 704/239, 231, 257

[56] References Cited

U.S. PATENT DOCUMENTS

| | | | |
|---|---|---|---|
| 5,031,113 | 7/1991 | Hollerbauer | 364/513.5 |
| 5,625,711 | 4/1997 | Nicholson et al. | |
| 5,729,637 | 3/1998 | Nicholson et al. | |
| 5,799,273 | 8/1998 | Mitchell et al. | 704/235 |
| 6,026,360 | 2/2000 | Ono | 704/260 |

OTHER PUBLICATIONS

Digital Dictate; Technical Manual and Installation Guide Release 2.4; Interface version for IBM Voice Type and Windows word processors supported by Digital Dictate, Mar. 1995.

Wilcox et al., "Wordspotting for Voice Editing and Audio Indexing," CH'92 Conference Proceedings, May 3–7, 1992, 2 pgs.

Microsoft Corporation, Web Page Describing SAPI Speech SDK, 1 page.

Microsoft Corporation, Voice Dictation API Reference, 15 pages, copyright 1995–1998.

Virage, Inc., Video Cataloger 1.3, 6 pages, copyright 1998.

*Primary Examiner*—David R. Hudspeth
*Assistant Examiner*—Abul K. Azad
*Attorney, Agent, or Firm*—Fish & Richardson P.C.

[57] ABSTRACT

Methods and apparatus of processing, storing and transmitting an original data stream of digitized speech samples. The method converts a stream of digitized speech samples to a stream of text and associated reliability measures. A mixed-media data stream is created with the stream of text as a text component and selected portions of the digitized stream of speech as a speech component. The selected portions are those whose corresponding reliability measures fall below a threshold. The threshold can be changed to change the amount of storage or bandwidth used by the mixed-media data stream. The mixed-media data stream can be searched and the results can be spoken as synthetic speech derived form the text component or as speech samples taken from the digitized speech component.

30 Claims, 3 Drawing Sheets

MIXING DIGITIZED SPEECH AND TEXT USING RELIABILITY INDICES

BACKGROUND OF THE INVENTION

The present invention relates to the processing, storage, transmission, and playback of spoken information.

A speech recognition engine is a computer program that converts a digital audio input signal into recognized speech in a text or equivalent form. Speech recognition is also referred to as automatic speech recognition (ASR). In general, speech recognition engines analyze a digitized audio input signal, generally by characterizing the frequency spectrum of the incoming signal; recognize phonemes in the characterized input signal; recognize words or groups of words, generally using a vocabulary, a grammar, or both; and generate results to a calling application. Some engines provide results during the recognition process and provide, in addition to a best estimate, alternative estimates of what the speaker said.

A speech synthesis engine (a speech synthesizer) is a computer program that converts text into a digital audio signal that can be played to produce spoken language. Speech synthesis is also referred to as text-to-speech (TTS) conversion. TTS conversion involves structure analysis, determining where paragraphs, sentences and other structures start and end; analysis of special forms, such as abbreviations, acronyms, dates, times, numbers, currency, Web sites and so on; conversion of text to phonemes; analysis of prosody, such as pitch, rhythm, emphasis, and so on; and production of an audio waveform.

Application programs communicates with a speech recognition and a speech synthesis engine through the engine's application program interface (API). A number of standard application program interfaces exists. These include the Java Speech API, the Speech Recognition API (SRAPI), Microsoft Corporation's Speech API (SAPI) and IBM Corporation's Speech Manager API (SMAPI). The Java Speech API, for example, with the Java Synthesis Markup Language (JSML), provides the ability to mark the start and end of paragraphs and sentences for a synthesis engine; to specify pronunciations for any word, acronym, abbreviation or other special text representation; and to control explicitly pauses, boundaries, emphasis, pitch, speaking rate and loudness to improve the output prosody.

Speech recognition and speech synthesis engines are available from a number of vendors. These include AT&T, which offers WATSON; IBM Corporation, which offers ViaVoice; and Lernout & Hauspie Speech Products, which offers ASR and TTS Development Tools. Speech recognition engines, including engines that do recognition using hidden Markov modeling and neural networks, can generally provide a reliability measure for recognized words through a low-level interface. The reliability measure indicates the level of confidence the engine has that the associated word was recognized correctly. In a higher-level interface, a recognition threshold parameter can be used to set a normalized value from which an engine will report success or failure in recognition.

SUMMARY OF THE INVENTION

The invention provides methods and apparatus implementing techniques for optimizing the storage, search, retrieval, and playback of spoken information, converting the speech to text where that is possible and leaving the unconverted portion as an audio stream. During playback, either the text is played back, through use of text to speech conversion, or the audio stream is played back. Digital recordings of human speech are temporally synchronized with the results of applying speech recognition to extract the textual content of such recordings. A system employing the techniques can enable the location and retrieval of spoken information by making available the results of speech recognition for searching. Temporal synchronization between a mixed-media data stream of digitized speech and recognized text enables a system to play back appropriate segments of either the original digitized speech or the speech generated by a TTS conversion from recognized text.

In general, in one aspect, the invention features a method of processing an original data stream of digitized speech samples. The method includes converting a stream of digitized speech samples to a stream of text and associated reliability measures, the reliability measures indicating a level of confidence in the correctness of the speech to text conversion of the associated portions of the stream of text; and creating a mixed-media data stream including the stream of text as a text component and selected portions of the digitized stream of speech as a speech component, each selected portion corresponding to a portion of the stream of text having a reliability measure below a threshold.

Implementations of the invention can include one or more of the following advantageous features. The speech is transmitted by transmitting the mixed-media data stream. The mixed-media data stream is stored. The text of the received mixed-media data stream is converted to synthetic speech, the synthetic speech is spoken for the portions of the original speech where no digitized speech is present in the mixed-media data stream, and the digitized speech is spoken from the mixed-media data stream where it is present in the mixed-media data stream. A text component of the mixed-media data stream can be searched for text matching a text search request. If a search request finds a segment of text matching a text search request in the text component, it can speak the segment of text. The mixed-media data stream is created from two time-synchronized data streams. The first data stream is the original data stream of digitized speech samples, and the second data stream is the stream of text with associated reliability measures. Each word in the stream of text has an associated reliability measure. A reliability measure value below the threshold indicates that a corresponding portion of the converted text is unreliable. The amount of storage required to store the mixed-media data stream as it is created is measured. The threshold to change the amount of storage required to store the mixed-media data stream can be changed. The original data stream of digitized speech samples is received in a computer. The digitized speech samples is provided as input to a speech recognition engine. The speech recognition engine is a computer program that converts speech to text and produces reliability measures. The mixed-media data stream is created by a second computer program receiving as inputs the digitized speech samples, the text produced by the speech recognition engine, and the reliability measures produced by the speech recognition engine.

In general, in another aspect, the invention features a method of playing back an utterance digitized into speech samples. The method includes converting the digitized speech samples to text, each part of the text having a reliability measure associated with it; converting the text to synthetic speech; using the reliability measures to select for each part of the utterance either the corresponding speech samples or the corresponding part of the synthetic speech; and playing back the selected speech samples and synthetic speech.

In general, in another aspect, the invention features a method of processing a mixed-media data stream. The method includes reading a mixed-media data stream having a text component and a digitized speech component, the text component having text segments identified in the mixed-media data stream as doubtful and the digitized speech component having digitized speech corresponding to the text segments identified as doubtful; converting the text not identified as doubtful to synthetic speech; and generating an audio waveform from the mixed-media data stream by combining the digitized speech and the synthetic speech.

Implementations of the invention can include one or more of the following advantageous features. The method includes generating an audio waveform from the mixed-media data stream by combining the synthetic speech for the portions of the data stream where no digitized speech is present in the data stream with the digitized speech from the data stream where digitized speech is present in the data stream. The method includes speaking the audio waveform. The method includes finding in the text component a segment of text matching a text search request; and speaking the found segment of text.

In general, in another aspect, the invention features a computer program, residing on a computer-readable medium, and apparatus including such a computer program. Implementations of the computer program include instructions for causing a computer to perform steps of the methods of the invention.

Advantages that may be seen in implementations of the invention include one or more of the following. The invention provides a compact multi-media format for the storage, search, retrieval, transmission, and playback of information originating as speech. Use of this format for spoken information provides compact data storage, bandwidth-efficient data transmission, and searchable text. For example, in a voice mail system, the invention can be applied to a recorded message before the message is distributed and provide efficient use of bandwidth when the message is transmitted. Similarly, for a voice mail recipient, the invention can be applied to store and to archive received messages in a compact and searchable form.

Other features and advantages of the invention will become apparent from the following description and from the claims.

DETAILED DESCRIPTION

Figure 1:
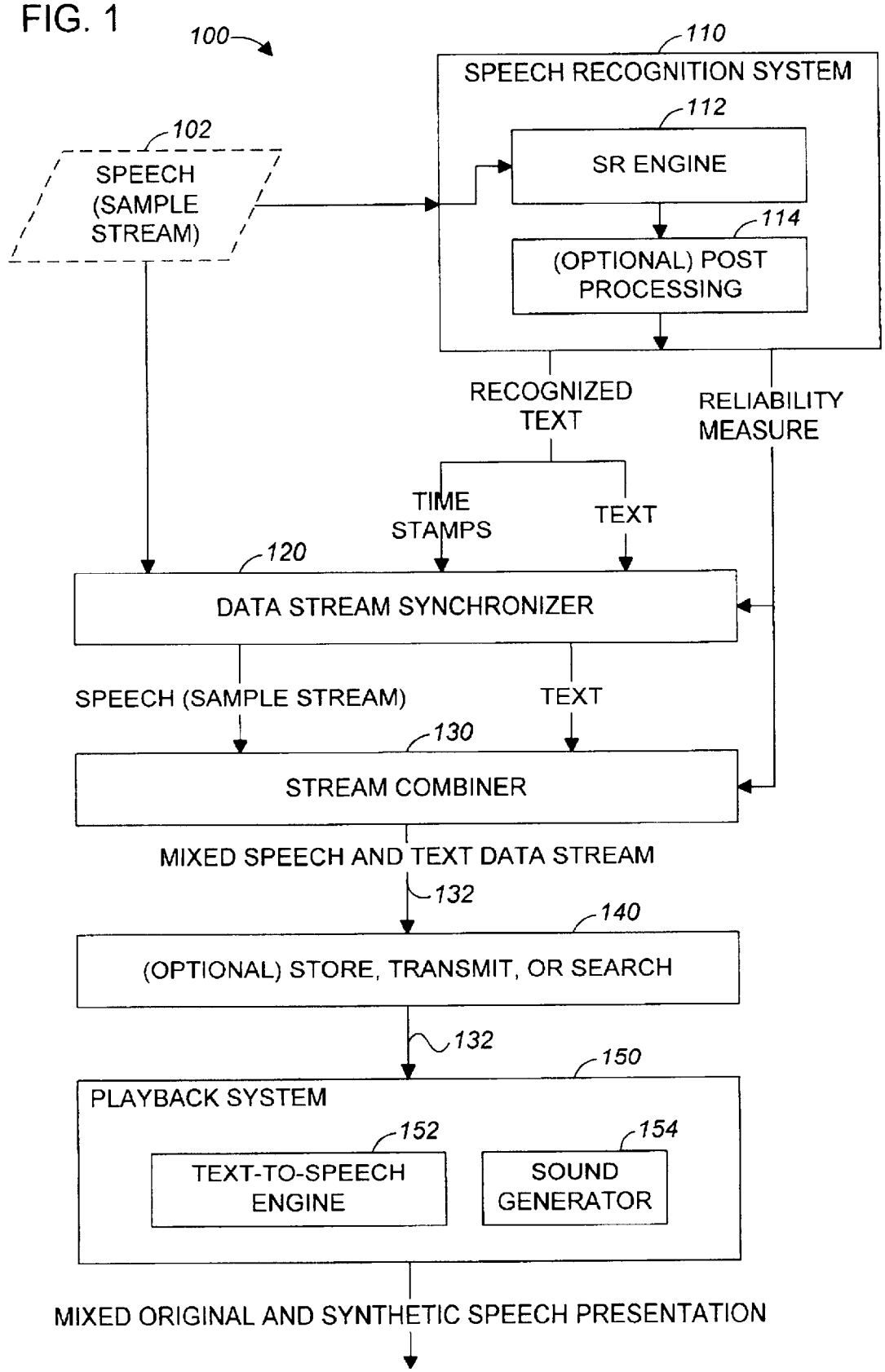
FIG. 1 is a schematic block diagram showing the flow of information in a system processing speech in accordance with the invention.
Figure 2:
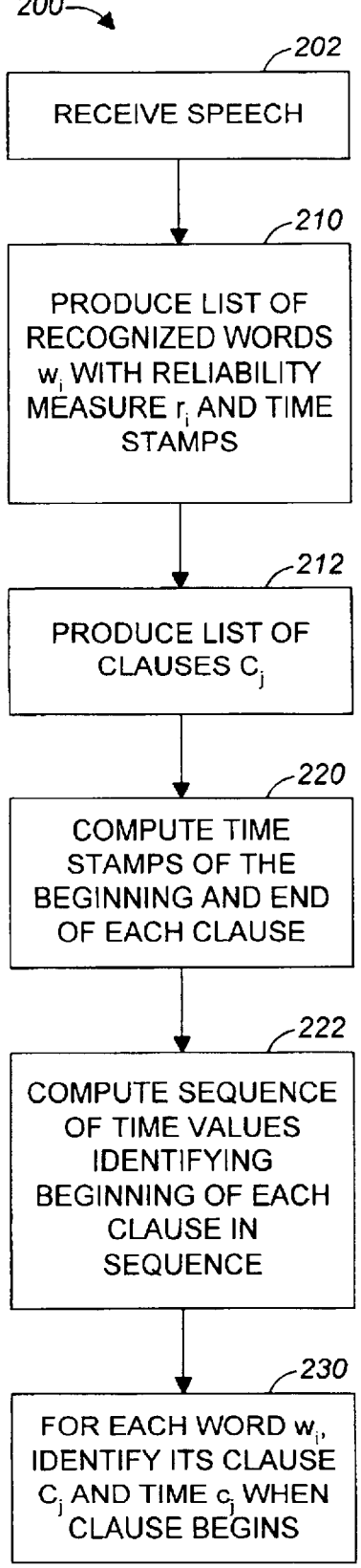
FIG. 2 is a flowchart of a method in accordance with the invention.

As shown in FIG. 1 and FIG. 2, a speech representation system 100 receives a stream of digitized speech samples 102 (step 202) and provides the samples to both a speech recognition system 110 and a data stream synchronizer 120. The speech input is received as an array of speech samples with a header including recording parameters. The sample array is indexed at the sampling rate. The sampling rate is recorded in the header. The array index is therefore a time stamp, and will be referred to as a time stamp, for the input sample stream 102.

The speech recognition system 110 has a speech recognition engine 112 and an optional subsystem 114 for performing post processing operations on the output data produced by the speech recognition engine 112. Although in a minimal implementation the recognition system 110 is essentially limited to a recognition engine, the recognition system generally provides an environment and application interface for the recognition engine to operate in the context of the representation system 100.

The recognition system 110 provides as output: words, reliability measures, and time stamps for the beginning and ending of each word (step 210). The reliability measure reflects the confidence level of the speech to text conversion on a word-by-word, word-by-phrase, or phrase-by-phrase basis. The recognition system 110 also identifies phrase and clause breaks in the input stream; phrase and clause segmentation is recognized and provided by the speech recognition engine 112 (step 212). This data is all provided to the data stream synchronizer 120.

The synchronizer 120, receiving recognized words with time intervals, constructs two temporally synchronized data streams: (i) digitized speech samples—the original data 102; and (ii) recognized text.

The stream combiner 130 receives the temporally synchronized data streams and calculates a time stamp for the onset and termination of each clause in the text stream (step 220) and a sequence of time values that identify the time at which each clause begins (step 222). Given a word $w_i$, the combiner identifies the clause that contains $w_i$ and the time stamps $c_j$ and $c_j'$ at which this clause begins and ends (step 230). In this context, the indices i and j are word and clauses indices, not time stamps, and so are subject to segmentation errors by the speech recognition engine 112.

Figure 3:
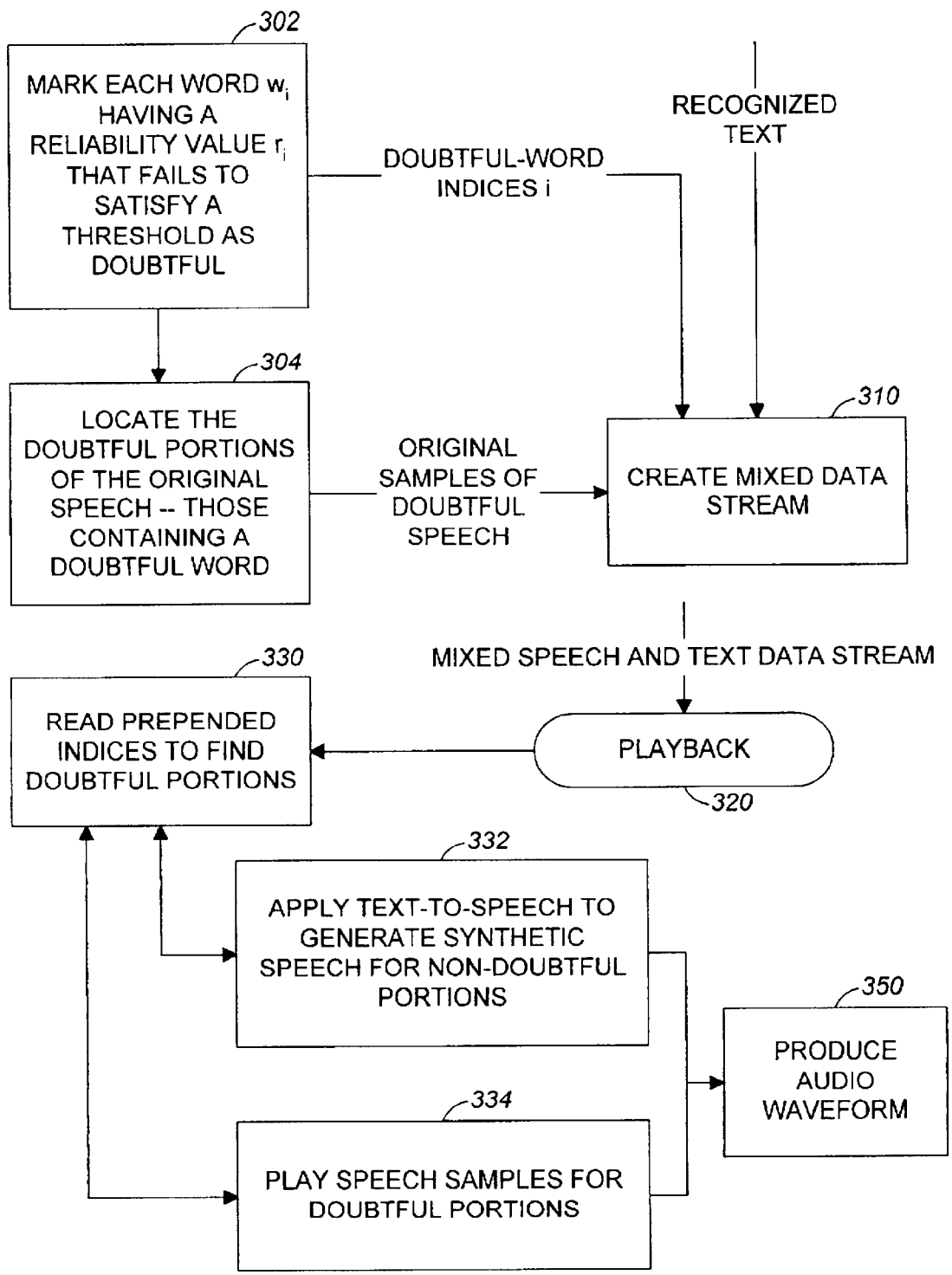
FIG. 3 is a flowchart of a method in accordance with the invention.

As shown in FIG. 3, the stream combiner compares the reliability measure $r_i$ for each recognized word $w_i$ to a reliability threshold. Words that fail to satisfy the threshold are considered doubtful and their indices i are provided as one input to a subprocess that performs the step (step 310) of creating a mixed-media data stream of digitized speech and recognized text 132 (FIG. 1). The phrases or clauses $C_j$ that contain doubtful words are located and the original speech samples for the time periods corresponding to the phrases or clauses are also provided (step 304). To create the mixed-media data stream, the recognized text (including the doubtful words) and speech sample segments corresponding to phrases and clauses containing doubtful words are combined (step 310). This is accomplished as follows.

For each doubtful word, the beginning and ending time stamps of the phrase or clause containing the word are found. The speech samples bounded by the time stamps are spliced into the stream of text data along with the word indices of the phrase or clause containing the word. The word indices marking the beginning and end of phrases or clauses containing doubtful words are prepended to the front of the data stream. Optionally, the text portion, the speech portion, or both portions of the resulting data stream can be compressed.

Returning to FIG. 1, the mixed-media data stream 132 can optionally be provided to a system element 140 to be stored, transmitted, or searched. Then, or at some later time, in the same or in a different system, the mixed-media data can be presented as speech by a playback system 150.

Playback system 150 plays back a mixed-media stream to create a speech presentation of the data. The playback system plays back the recognized text except for those phrases or clauses that contain doubtful words, for which the original speech samples are reproduced. The playback system includes a text-to-speech engine 152 and a sound generator 154, such as conventional personal computer sound generation hardware and software components.

As shown in FIG. 3, when the playback system 150 is invoked (step 320), it reads the prepended indices to find the doubtful portions of the mixed-media data stream 132 and to decide whether to play the text portion of the data stream as synthetic speech generated by the text-to-speech engine or to play the speech sample portion of the data stream through the sound generator (step 330). Using the word indices prepended to the data stream, which identify the portions (phrases or clauses) that contain doubtful words, the playback system either (i) invokes TTS engine 152 to generate synthetic speech from the text in the data stream (step 332), or (ii) uses the sound generator 154 to reproduce the digitized speech data to play the doubtful phrases or clauses of the data stream (step 334), until the entire data stream (or a user-selected portion of it) has been played back. The TTS engine and the sound generator notify the playback system 150 when they have completed playing their assigned words and sounds, and the playback system uses this information to synchronize them and provide a smooth flow of speech. In this way, an audio output waveform is produced that is a recreation representing the original speech input (step 350).

The techniques of the invention can be used in the following illustrative architectures and modes of operation. In a client-server architecture, where the server is the portion of a system responsible for capturing and transmitting the spoken message and the client is the portion of the system responsible for receiving and playing back speech, intelligent operation can be located in either or both of the two components. For example, a server operating intelligently can decide what threshold values are used, depending, for example, on bandwidth constraints, create the mixed-media data stream according to the threshold values, and deliver the data stream to a client. In this scenario, the client need only play back the received data stream. The roles can also be reversed, with the server merely transmitting recorded speech. A smart client can then choose a threshold value based on user preference—depending on desired quality, for example—and produce a mixed-media data stream for further use, such as storage, playback, or retransmission. The client and server can also operate with shared intelligence, interacting with each other to set threshold values, for example.

In addition to a client-server architecture, the techniques of the invention can be used in multi-component architectures. One example is a system in which a speech archival component stores spoken messages in the form of mixed-media data streams, an indexing system creates one or more indices to support searching over the stored speech and associated recognized text, and a query system performs searches against an index or indices and returns rich mixed-media data streams. These data streams can be processed in any of a number of ways. For example, the data streams can be processed by a smart client, as described above; or the data streams can be processed by an intermediary process that produces from the mixed-media stream a digital wave form for playback on a dumb client such as a digital cellular telephone.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device, such as a monitor or LCD screen, for displaying information to the user; an audio output subsystem, including an audio output device such as a speaker, for producing sound output to the user; a keyboard and a pointing device, such as a mouse or a trackball, by which the user can provide text and graphical input to the computer system; and an audio input subsystem, such as a microphone or an audio diskette or tape reader, by which the user can provide audio input, and, in particular, speech input. The computer system can be programmed to provide a user interface using graphics, speech recognition and speech generation, or both, through which computer programs interact with users.

Other embodiments are within the scope of the following claims. For example, the order of performing steps of the invention can be changed by those skilled in the art and still achieve desirable results. The threshold by which doubtful words are identified can be changed dynamically—for example, to achieve a target data rate in the mixed-media output stream or to achieve a target size for mixed-media storage. The recognized text corresponding to doubtful words can be left out of the mixed-media data stream.

What is claimed is:

1. A method of processing an original data stream of digitized speech samples, comprising:

converting a stream of digitized speech samples to a stream of text and associated reliability measures, the reliability measures indicating a level of confidence in the correctness of the speech to text conversion of the associated portions of the stream of text; and creating a mixed-media data stream comprising the stream of text as a text component and selected portions of the digitized stream of speech as a speech component, each selected portion corresponding to a portion of the stream of text having a reliability measure below a threshold.

2. The method of claim 1 of processing and transmitting speech, further comprising:

transmitting the speech by transmitting the mixed-media data stream.

3. The method of claim 2, further comprising:

receiving the mixed-media data stream;

converting the text of the received mixed-media data stream to synthetic speech; and speaking the mixed-media data stream by speaking the synthetic speech for the portions of the original speech where no digitized speech is present in the mixed-media data stream and speaking the digitized speech from the mixed-media data stream where digitized speech is present in the mixed-media data stream.

4. The method of claim 1 of processing and storing speech, further comprising:

storing the mixed-media data stream.

5. The method of claim 4, further comprising:

receiving the mixed-media data stream;

converting the text of the received mixed-media data stream to synthetic speech; and speaking the mixed-media data stream by speaking the synthetic speech for the portions of the original speech where no digitized speech is present in the mixed-media data stream and speaking the digitized speech from the mixed-media data stream where it is present in the mixed-media data stream.

6. The method of claim 4, further comprising:

searching the text component of the mixed-media data stream for text matching a text search request.

7. The method of claim 1, further comprising:

searching the text component of the mixed-media data stream for text matching a text search request.

8. The method of claim 6, further comprising:

finding in the text component a segment of text matching a text search request; and speaking the segment of text.

9. The method of claim 1, wherein the mixed-media data stream is created from two time-synchronized data streams, the first being the original data stream of digitized speech samples, and the second being the stream of text having associated reliability measures.

10. The method of claim 1, wherein:

each word in the stream of text has an associated reliability measure, a reliability measure value below the threshold indicating that a corresponding portion of the converted text is unreliable.

11. The method of claim 1, further comprising:

measuring the amount of storage required to store the mixed-media data stream as it is being created; and changing the threshold to change the amount of storage required to store the mixed-media data stream.

12. The method of claim 1, wherein:

the original data stream of digitized speech samples is received in a computer;

the digitized speech samples are provided as input to speech recognition engine, the speech recognition engine being a computer program running in the computer, to convert speech to text and produce reliability measures; and the mixed-media data stream is created by a second computer program receiving as inputs the digitized speech samples, the text produced by the speech recognition engine, and the reliability measures produced by the speech recognition engine.

13. A computer program, residing on a computer-readable medium, comprising instructions for causing a computer to:

convert a stream of digitized speech samples to a stream of text and associated reliability measures, the reliability measures indicating a level of confidence in the correctness of the speech to text conversion of the associated portions of the stream of text; and create a mixed-media data stream comprising the stream of text as a text component and selected portions of the digitized stream of speech as a speech component, each selected portion corresponding to a portion of the stream of text having a reliability measure below a threshold.

14. The computer program of claim 13, further comprising instructions to:

store the mixed-media data stream.

15. The computer program of claim 13, further comprising instructions to:

receive the mixed-media data stream;

convert the text of the received mixed-media data stream to synthetic speech; and speak the mixed-media data stream by speaking the synthetic speech for the portions of the original speech where no digitized speech is present in the mixed-media data stream and speaking the digitized speech from the mixed-media data stream where it is present in the mixed-media data stream.

16. The computer program of claim 15, farther comprising instructions to:

search the text component of the mixed-media data stream for text matching a text search request.

17. The method of claim 15, further comprising instructions to:

find in the text component a segment of text matching a text search request; and speaking the segment of text.

18. The computer program of claim 13, further comprising instructions to:

search the text component of the mixed-media data stream for text matching a text search request.

19. The method of claim 13, further comprising instructions to:

find in the text component a segment of text matching a text search request; and speaking the segment of text.

20. The method of claim 13, wherein the mixed-media data stream is created from two time-synchronized data streams, the first being the original data stream of digitized speech samples, and the second being the stream of text having associated reliability measures.

21. The method of claim 13, wherein:

each word in the stream of text has an associated reliability measure, a reliability measure value below the threshold indicating that a corresponding portion of the converted text is unreliable.

22. The method of claim 13, further comprising instructions to:

measure the amount of storage required to store the mixed-media data stream as it is being created; and change the threshold to change the amount of storage required to store the mixed-media data stream.

23. A method of processing a mixed-media data stream, comprising:

reading a mixed-media data stream comprising a text component and a digitized speech component, the text component comprising text segments identified in the mixed-media data stream as doubtful and the digitized speech component comprising digitized speech corresponding to the text segments identified as doubtful;

converting the text not identified as doubtful to synthetic speech; and generating an audio waveform from the mixed-media data stream by combining the digitized speech and the synthetic speech.

24. The method of claim 23, further comprising:

generating an audio waveform from the mixed-media data stream by combining the synthetic speech for the portions of the data stream where no digitized speech is present in the data stream with the digitized speech from the data stream where it is present in the data stream.

25. The method of claim 23, further comprising:

speaking the audio waveform.

26. The method of claim 23, further comprising:

finding in the text component a segment of text matching a text search request; and speaking the segment of text.

27. Apparatus comprising a computer-readable storage medium tangibly embodying program instructions for presenting information in spoken form, the program instructions including instructions operable for causing a programmable processor to:

read a mixed-media data stream comprising a text component and a digitized speech component, the text component comprising text segments identified in the mixed-media data stream as doubtful and the digitized speech component comprising digitized speech corresponding to the text segments identified as doubtful;

convert the text not identified as doubtful to synthetic speech; and generate an audio waveform from the mixed-media data stream by combining the digitized speech and the synthetic speech.

28. The apparatus of claim 27, wherein the program instructions further comprise instructions to:

generate an audio waveform from the mixed-media data stream by combining the synthetic speech for the portions of the original speech where no digitized speech is present in the mixed-media data stream and speaking the digitized speech from the mixed-media data stream where it is present in the mixed-media data stream.

29. The method of claim 27, wherein the program instructions further comprise instructions to:

speak the audio waveform.

30. The method of claim 27, wherein the program instructions further comprise instructions to:

find in the text component a segment of text matching a text search request; and speak the segment of text.

* * * * *